(12) United States Patent
Fong

(10) Patent No.: US 7,380,966 B2
(45) Date of Patent: Jun. 3, 2008

(54) PHOTOGRAPHIC LIGHT DIFFUSER

(75) Inventor: Gary M. Fong, Marina Del Rey, CA (US)

(73) Assignee: Gary Fong, Inc., Marina Del Rey, CA (US)

( * ) Notice: Subject to any disclaimer, the term of this patent is extended or adjusted under 35 U.S.C. 154(b) by 0 days.

(21) Appl. No.: 11/285,947

(22) Filed: Nov. 23, 2005

(65) Prior Publication Data

US 2006/0109641 A1    May 25, 2006

Related U.S. Application Data

(63) Continuation-in-part of application No. 11/055,934, filed on Feb. 11, 2005.

(60) Provisional application No. 60/630,637, filed on Nov. 24, 2004.

(51) Int. Cl.
*F21V 7/00* (2006.01)

(52) U.S. Cl. ............... 362/375; 362/374; 362/16; 362/355; 362/361

(58) Field of Classification Search ............ 362/374, 362/375, 376, 351, 16, 310, 311, 355, 359, 362/360, 361
See application file for complete search history.

(56) References Cited

U.S. PATENT DOCUMENTS

| | | | | |
|---|---|---|---|---|
| 756,194 A | * | 3/1904 | Zalinski | 362/333 |
| 1,769,993 A | * | 7/1930 | Gillinder | 362/327 |
| 1,874,086 A | * | 8/1932 | Dickson | 362/355 |
| 2,235,864 A | * | 3/1941 | Brennan et al. | 362/102 |
| 3,191,022 A | * | 6/1965 | Wince | 362/309 |
| 3,855,602 A | | 12/1974 | Hoos | |
| 4,066,885 A | | 1/1978 | Weinberg | |
| 4,084,168 A | | 4/1978 | Pizzuti et al. | |
| 4,091,402 A | | 5/1978 | Siegel | |
| 4,091,444 A | * | 5/1978 | Mori | 362/374 |
| 4,146,918 A | | 3/1979 | Tureck | |
| 4,251,854 A | | 2/1981 | Kaneko et al. | |
| 4,446,506 A | | 5/1984 | Larson | |
| 4,479,173 A | * | 10/1984 | Rumpakis | 362/294 |
| 4,562,521 A | * | 12/1985 | Noguchi | 362/433 |
| 4,633,374 A | | 12/1986 | Waltz et al. | |
| 4,757,425 A | | 7/1988 | Waltz | |
| 5,095,325 A | | 3/1992 | Carstens | |
| 5,154,503 A | | 10/1992 | Sternsher | |

(Continued)

OTHER PUBLICATIONS

Internet: http://www.lumiquest.com/; LumiQuest The World Leader in Flash Accessories for Digital & Film; © 2005 LumiQuest; 1 sheet.

(Continued)

*Primary Examiner*—Thomas M Sember
(74) *Attorney, Agent, or Firm*—Christie, Parker & Hale, LLP.

(57) ABSTRACT

A photographic light diffusing device is provided. A flexible, transparent cowl is adapted to be mounted on a photographic light source, the cowl including a plurality of ribs and an opening through which the photographic light source is visible when the cowl is mounted on the photographic light source. The cowl elastically deforms to fit onto the photographic light source. A removable, flexible cover is placed over the opening of the cowl.

6 Claims, 9 Drawing Sheets

U.S. PATENT DOCUMENTS

| | | |
|---|---|---|
| 5,311,409 A | 5/1994 | King |
| 5,556,186 A | 9/1996 | Pilby |
| 5,560,707 A * | 10/1996 | Neer .......................... 362/376 |
| 5,839,006 A | 11/1998 | Beckerman |
| 6,361,192 B1 * | 3/2002 | Fussell et al. .............. 362/331 |
| 6,502,962 B1 * | 1/2003 | Menke et al. ............... 362/294 |
| 6,981,785 B1 * | 1/2006 | Watchulonis ............... 362/352 |

OTHER PUBLICATIONS

Internet: http://www.stofen.com/; STO-FEN Products; 1 sheet.
Product Pamphlet: Stroboframe Flash Brackets and accessories; © 1992; 16 sheets.
Product Pamphlet: LumiQuest Photographic Accessories; 3 sheets.
Magazine Article: Stint, S., "Stint's View", Popular Photography, Feb. 1996, 3 sheets.

* cited by examiner

PHOTOGRAPHIC LIGHT DIFFUSER

CROSS-REFERENCE TO RELATED APPLICATION

This application is a continuation-in-part of U.S. patent application Ser. No. 11/055,934, filed Feb. 11, 2005, which claims the benefit of the filing date of U.S. provisional patent application No. 60/630,637, filed Nov. 24, 2004, the contents of which are all hereby incorporated by reference.

FIELD OF THE INVENTION

The present invention relates to photographic light diffusers and more particularly to portable light diffusers having compound geometry and separable components.

BACKGROUND

Diffuse lighting accessories are photography devices commonly used to provide soft lighting effects in photographs. To achieve a diffuse lighting effect, light can be either directly or indirectly passed through a semi-transparent material, or it may be reflected off a material which will cause it to scatter somewhat. Such diffuse lighting is commonly produced by light sources which are remote from the camera. Typically, such light diffusers are provided by stationary screens, umbrellas, soft boxes and the like. Such devices provide excellent lighting effects in fixed studio settings where there is no need to transport the lighting equipment including the diffusers from place to place.

Each particular shot to be lighted dictates the type and intensity of light needed to properly illuminate the subject. In some situations direct light from a light source without any alteration may be required. In other situations direct lighting may be too strong or cast overly distinct shadows, in which case a more diffuse light is desirable. In still other cases, an even more indirect diffuse light may be needed to create the proper lighting effect. It is important to have a certain amount of uniformity in the lighting used to illuminate the subject. This uniformity may be achieved using typical stationary diffusers provided that the equipment is of good quality and is employed in the proper fashion.

While the equipment described above provides good lighting effects in a fixed studio setting, it can be inconvenient if not impossible to use such stationary lighting accessories outside of the photography studio. For shoots which require the photographer to be mobile, outside of the photography studio. For shoots which require the photographer to be mobile, especially shoots where the photographer must capture action shots or cannot otherwise pose his subject, a small portable diffuser may be used which attaches directly to the camera itself. Such a light diffuser may be placed directly over an on-camera flash to provide a semi-transparent barrier to clear light transmission. Known diffusers exist which are small and portable with the camera and flash itself, and these diffusers are used by photographers in shoots where it is impractical to employ fixed lighting equipment. However, known portable diffusers for use with on-camera flashes are less than ideal in terms of the quality of lighting produced. These diffusers tend to create hotspots and may also leave noticeable, undesirable shadows.

SUMMARY OF THE INVENTION

In an exemplary embodiment, a photographic light diffuser is provided made from a translucent thermoplastic such as polypropylene or vinyl. In a further embodiment, the photographic light diffuser is made from flexible polyvinylchloride. The photographic light diffuser may be mounted directly to the head of an on-camera flash unit. The diffuser has a tapered cylindrical body which produces a soft, highly diffused and flattering light quality. The diffuser also includes a rectangular base with a flat surface to add an amount of specular or focused light. Because of the tapered cylindrical shape of the body of the diffuser, regardless of whether shots are taken in the vertical or horizontal position or under high or low ceilings the diffuser produces the same soft, flattering light quality. The present diffuser allows a photographer to achieve studio-quality lighting and greatly minimize shadows while providing a desirable light balance. In an alternative embodiment, the diffuser is provided with a removable dome which helps to diffuse light even further, especially in environments with low ceilings. Because the dome is removable, it allows one to easily shoot "flash direct" without needing to first remove the cowl that comprises the base of the diffuser.

In another exemplary embodiment, a photographic light diffuser comprises a semi-transparent cowl which is adapted to be mounted on a photographic light source, the cowl including an opening through which the photographic light source is visible when the cowl is mounted thereon, and a removable semi-transparent cover detachably mounted on the cowl.

In an alternative embodiment, a photographic light diffuser which is adapted to be mounted on a photographic light source comprises a base of a shape adapted to be mounted on a light source, a body extending from the base having both a generally convex outer surface as well as a smaller flat portion, and a cover connected to the body.

In yet another embodiment, a camera flash system comprises a camera flash unit, and a diffuser unit having an adaptor and a tapered cylindrical body. The adaptor is formed to match the shape of the housing of the camera flash unit so that it may be fitted thereto, and the adaptor extends between the camera flash unit and the tapered cylindrical body of the diffuser unit. The diffuser unit widens from the adaptor to meet the tapered cylindrical body.

In an exemplary embodiment, a photographic light diffusing device includes an at least partially transparent cowl adapted to be mounted on a photographic light source. The cowl includes a plurality of ribs and an opening through which the photographic light source is visible when the cowl is mounted on the photographic light source. The photographic light diffusing device can include a cover, where the cover at least partially fills the opening. The cover may be dome shaped and removable, and may extend outwardly or inwardly from the cowl. The cowl may be tinted and made from a flexible transparent material, and may include a flexible base adapted to fit on a plurality of different photographic light sources. The flexible base of the cowl may include a plurality of contact arms adapted to grip the photographic light source.

In another embodiment, the photographic light diffusing device includes an at least partially transparent cowl adapted to be mounted to a photographic light source. The cowl includes a base including a socket adapted to be mounted to the photographic light source. A tapered body with an opening opposite the base through which the photographic light source is directly visible when the base is mounted to the photographic light source. The tapered body further includes a convex portion through which light from the photographic light source is diffused. The photographic light diffusing device may include a cover adapted to fit over the opening. The cover may be removable and of a dome shape. The dome shape may extend outwardly or inwardly from the cowl. The tapered body of the cowl may be generally cylindrical. The cowl may be formed of a flexible transparent material and may include a plurality of ribs.

Figure 1:
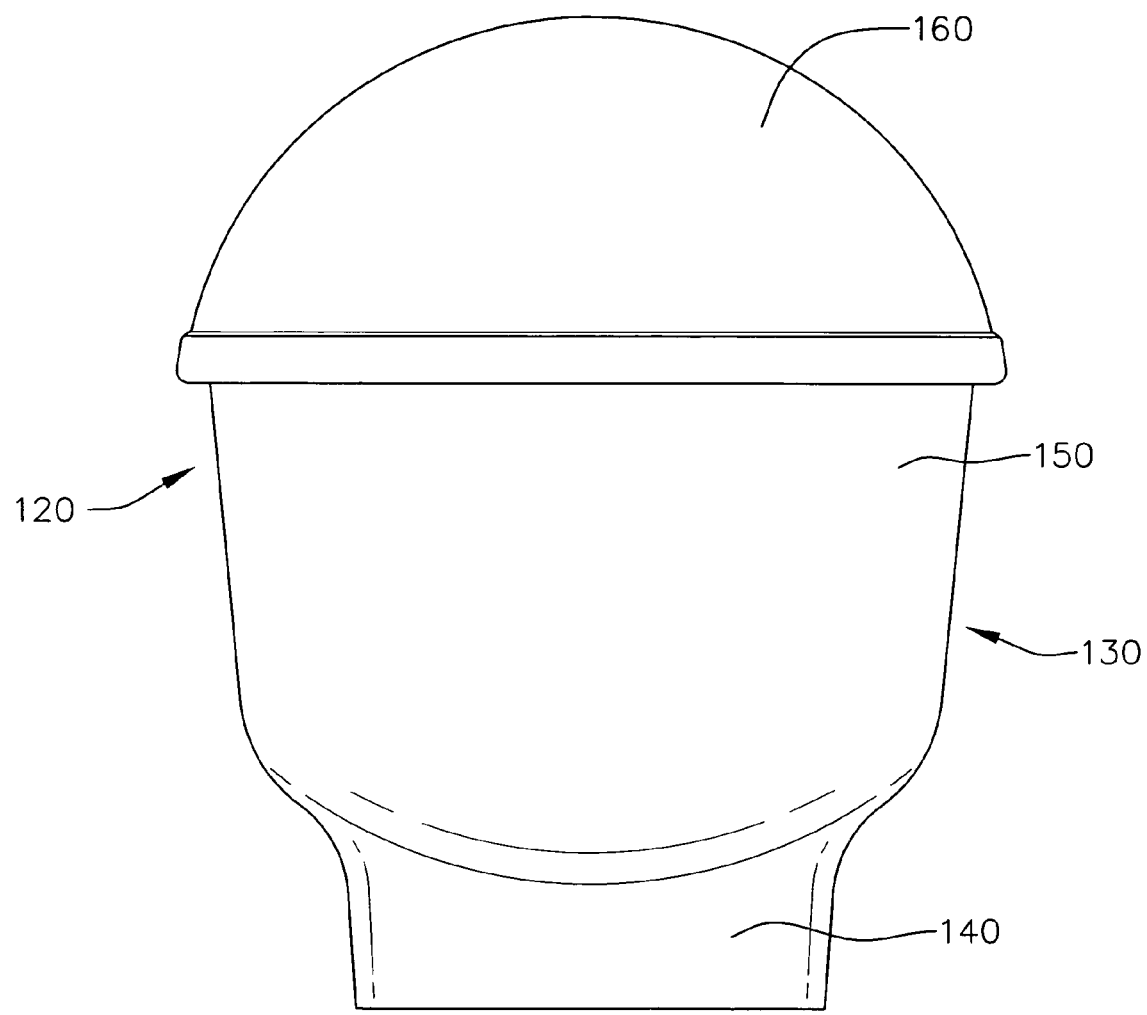
FIG. 1 shows a front view of a photographic light diffuser according to one embodiment of the present invention.

Before any embodiment of the invention is explained in detail, it is to be understood that the invention is not limited in its application to the details of construction and arrangements of components set forth in the following description, or illustrated in the drawings. The invention is capable of alternative embodiments and of being practiced or being carried out in various ways. Also, it is to be understood that the terminology used herein is for the purpose of illustrative description and should not be regarded as limiting.

DETAILED DESCRIPTION

The present photographic flash diffuser provides high quality lighting effects when used with on-camera flashes, allowing photographers to achieve studio-quality lighting using electronic on-camera flashes without the need for separate lighting equipment. By doing so, the present diffuser does away with needing to carry around and use cumbersome lighting equipment such as brackets, umbrellas, soft boxes and the like, allowing for truly mobile, spontaneous photography.

FIG. 1 shows a front view of a photographic light diffuser 120 according to one embodiment of the present invention. This diffuser 120 may in one exemplary embodiment be formed from plastics using a vacuum molding process. It may also be made from other molding and non-molding plastic forming processes, as well as being formed from other appropriate semi-transparent or translucent materials as will be understood by one skilled in the art. The mold surface may be roughened to provide the diffuser 120 with a semi-transparent or translucent finish. This roughened surface may be created by treating the mold with a sand or bead blasting process. In one embodiment, the diffuser 120 may be formed having two separable parts. However, in an alternative embodiment, the diffuser 120 may be formed as a single piece having roughly the same overall shape as the embodiments shown.

As shown in the embodiment of FIG. 1, the diffuser 120 is provided having two component parts; a cowl 130 and a removable dome 160. The cowl 130 is provided with a generally rectangular base 140 allowing it to attach directly to the head of an on-camera flash unit. In one embodiment, the generally rectangular base 140 may be friction fitted to the head of the on-camera flash unit. In alternative embodiments, the generally rectangular base 140 of the diffuser 120 may be mounted on the flash unit using a bracket permanently or removably attached to the flash unit, or it may be mounted using a threaded collar, a bayonet style mount, using Velcro, or by other appropriate methods known to those skilled in the art.

Figure 2:
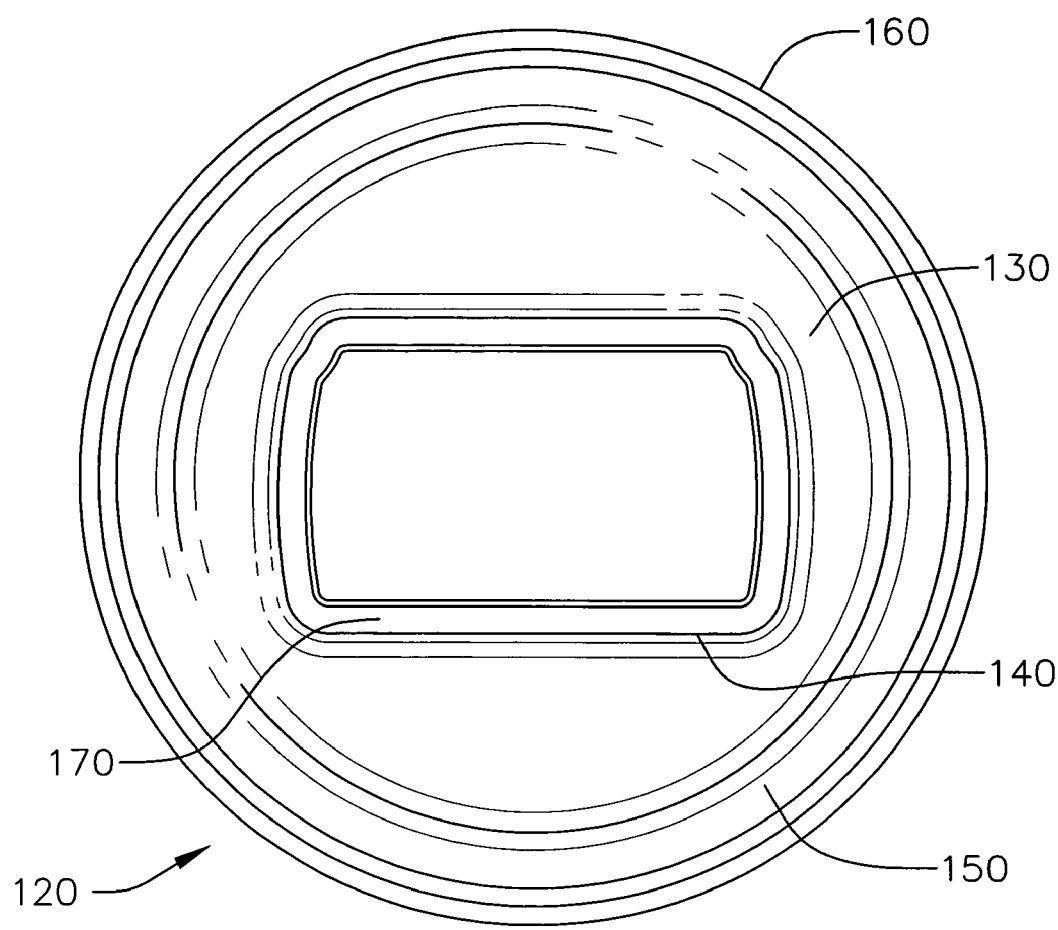
FIG. 2 shows a bottom view of the photographic light diffuser of FIG. 1.

FIG. 2 shows a bottom view of the photographic light diffuser 120 of FIG. 1. FIG. 2 illustrates that the generally rectangular base 140 of the present diffuser 120 may be provided with a basal socket 170 of specific interior dimensions in order to match the exterior dimensions of standard camera flashes. This particular embodiment of a basal socket is designed to be friction fit to a Nikon SB-800 Speedlight flash unit. Other basal sockets may be configured for a friction fit with other models of camera flash units.

Figure 3:
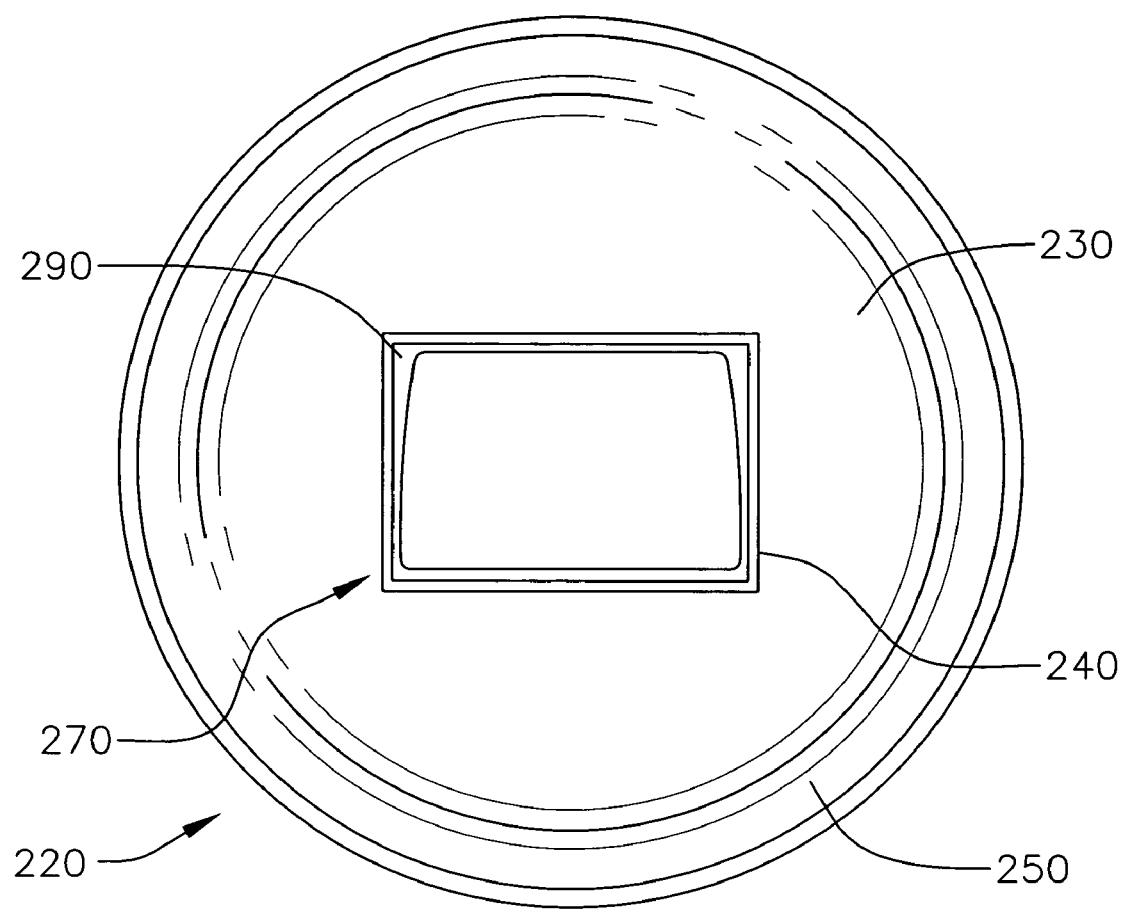
FIG. 3 shows a bottom view of an alternative embodiment of a photographic light diffuser.
Figure 4:
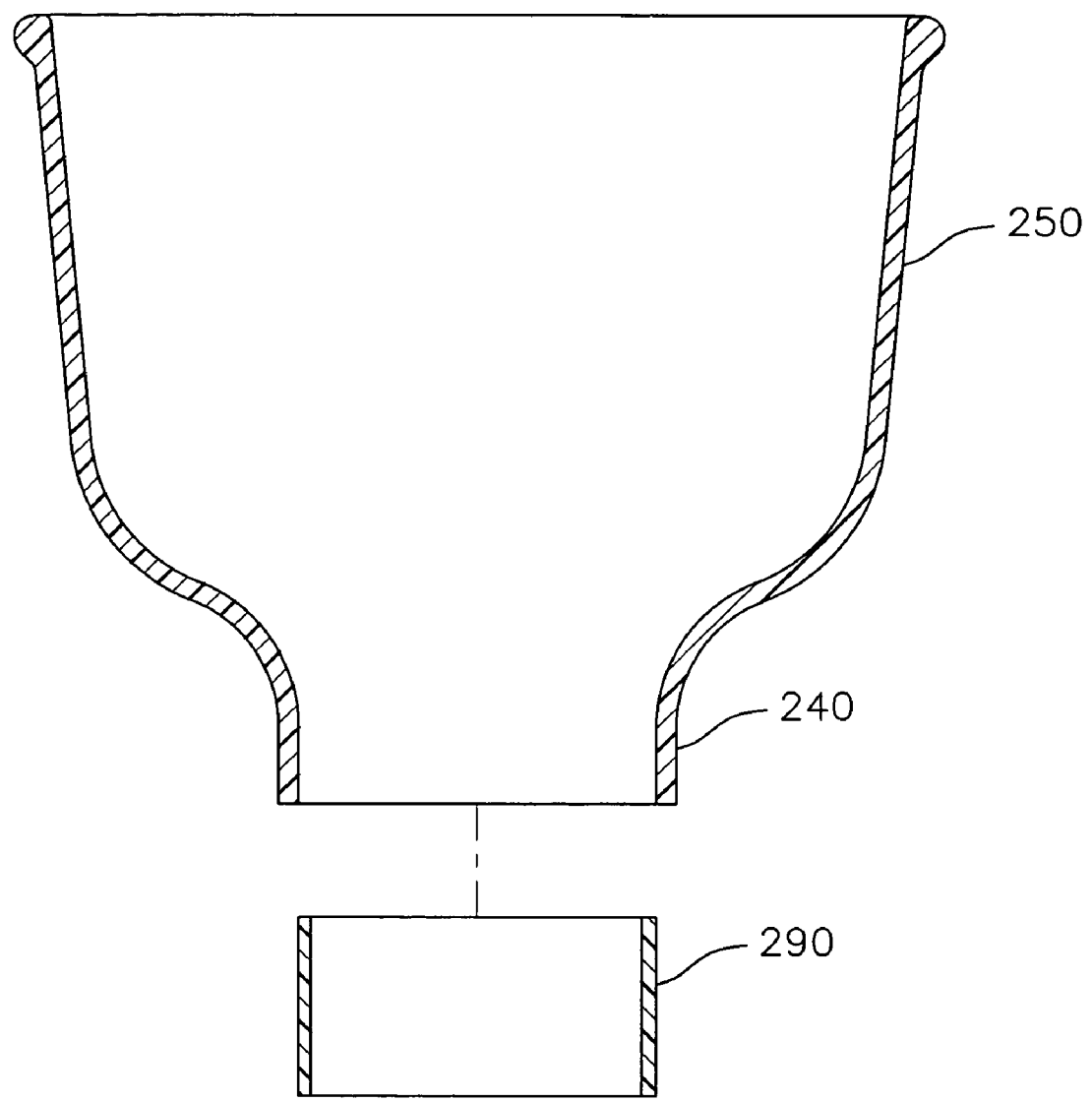
FIG. 4 shows a side view in section of the photographic light diffuser of FIG. 3.

In yet another embodiment, FIGS. 3 and 4 show a photographic light diffuser with a generally rectangular base 240 that differs in size from the generally rectangular base 140 of the diffuser 120 shown in FIG. 2. In this embodiment, the basal socket 270 of the diffuser 220 is of a predetermined size to accept any one of a number of different adaptors 290, and it is the adaptor 290, rather than the basal socket 270, which sized to fit the exterior dimensions of the desired camera flash. The adaptor 290 may be a gasket-style adapter made from a flexible material to fit various flash units from different manufacturers, or it may be made from a stiffer material and designed to fit a single flash unit. The use of a diffuser with a "universal-mount" base of this embodiment permits a single diffuser to be used with various different flash units of widely different shapes by use of different adaptors.

Returning to the diffuser 120 of FIG. 2, in an exemplary embodiment the base 140 extends past a minimum length of about one half inch to permit the base to fit over a flash unit, as well as to provide a generally rectangular base 140 between the flash unit itself and the body of cowl 130 of the diffuser 120 through which light from the flash travels. This relatively small generally rectangular base 140 adds an amount of direct or specular lighting to the flash effect created by the diffuser 120. This effect is caused by the close proximity of the walls of the diffuser 120 in the area of the generally rectangular base 140 to the flash itself, causing light to be refracted through this area of the diffuser 120 with a greater intensity than through the tapered cylindrical body 150 of the diffuser 120.

Accordingly, the lighting properties of the diffuser 120 can be varied by varying the relative proportions of the diffuser 120, specifically the length and breadth of the passage through the generally rectangular base 140 with respect to the size of the tapered cylindrical body 150 of the diffuser 120. A shorter passage and a larger tapered cylindrical body would cause the diffuser 120 to provide less of a direct and more of a diffused lighting effect. Conversely, a relatively longer passage and smaller tapered cylindrical body would affect the balance of the lighting effect created by the diffuser 120 in the opposite manner.

While the purpose the of the diffuser 120 is to ameliorate the harsh effects of direct lighting, some amount of direct light, or "key light" is desirable to provide an amount of specularity in an exposed image. The higher intensity gives a catchlight to the eyes of photographic subjects and prevents the image from appearing too soft. The compound geometry in the present diffuser 120 is designed to strike a balance between an image that is too harsh and one that is too soft.

Figure 5:
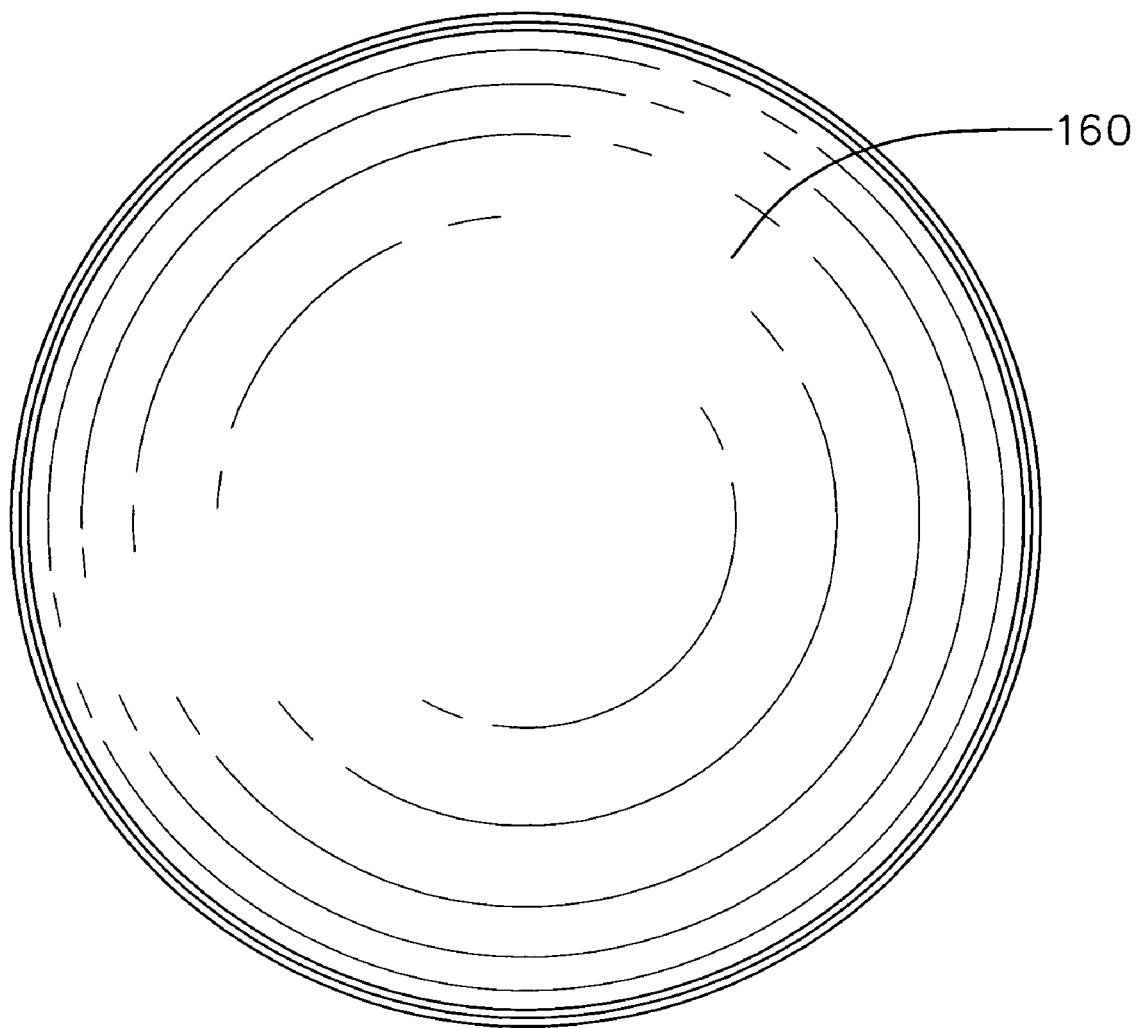
FIG. 5 shows a top view of the photographic light diffuser of FIG. 1.
Figure 7:
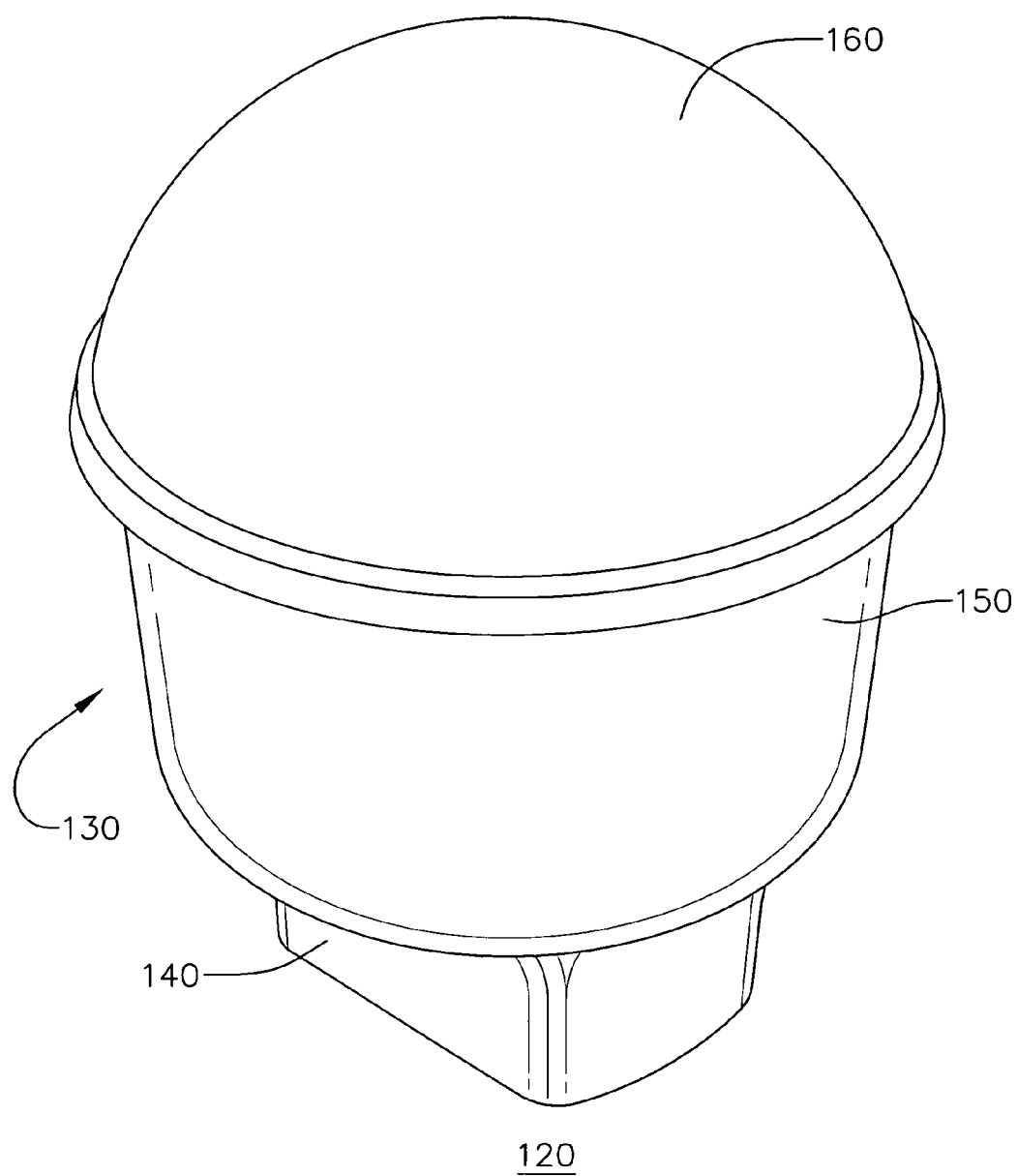
FIG. 7 shows a perspective view of the photographic light diffuser of FIG. 1.

As shown in FIG. 1, the rectangular base of the diffuser 120 melds seamlessly into the tapered cylindrical body 150, which helps to reduce hot spots and smoothly transitions the light distribution of the diffuser 120 from the more direct light of the rectangular base to the more diffuse light provided by the tapered cylindrical body 150. The side view of the diffuser 120 of FIG. 1 also shows a cowl 130 of which the tapered cylindrical body 150 is a part, as is the generally rectangular base 140. To this cowl 130 is connected the removable dome 160. In contrast, FIG. 5 shows a top view of a photographic light diffuser 120 having a dome 160. Finally, FIG. 7 shows a perspective view of a photographic light diffuser 120 according to one embodiment of the present invention having a cowl 130 comprising a generally rectangular base 140 and a tapered cylindrical body 150, and a dome 160 attached thereto.

Returning now to FIG. 1, an exemplary embodiment of the present diffuser 120 is shown wherein the tapered cylindrical body 150 is radially symmetric with respect to an axis extending along the direction of the flash unit on which the diffuser 120 is mounted. In this embodiment, the tapered cylindrical body 150 of the diffuser 120 is slightly tapered, flaring out as it extends away from the rectangular base. This tapered shape, while not required, helps to further reduce the hot spots which would otherwise occur as the light energy from the flash strikes the nearer parts of the tapered cylindrical body 150 with greater intensity than the farther, reducing the diffuse effect otherwise created by the tapered cylindrical body 150. While some direct lighting effect is desired as discussed above, it can be provided more evenly and reliably by the generally rectangular base 140, and as such it is desirable in the embodiment shown to emphasize the diffuse lighting function of the tapered cylindrical body 150 at the expense of the direct lighting function by providing this taper. With the present diffuser 120, the softness of the lighting effect produced comes as much if not more so from the shape of the diffuser 120 itself and especially the manner in which light is evenly refracted through the surface of the tapered cylindrical body 150 as from the dispersal of light around the room, including light reflected by the walls and ceilings.

In one embodiment, the tapered cylindrical body 150 of the diffuser 120 allows it to provide similar lighting effects when used in either the vertical or horizontal positions, regardless of its orientation. Accordingly, unlike prior art diffusers, no flash bracket is needed with the present diffuser 120 to keep the flash in an upright position during both vertical and horizontal photography. In alternative embodiments, the tapered cylindrical body 150 of the diffuser 120 may form an ellipse in cross section, or one of a set of n-sided polygons. In still other embodiments, the tapered cylindrical body 150 may be longer or shorter than is shown in the figures, or may be of a cylindrical or other shape such as a non-tapered shape. In one embodiment, the height and width of the diffuser are about equal to one another. In another embodiment, the diffuser is generally spherical in shape. In yet another embodiment, the diffuser is proportioned so that it is easy to pack and transport in that it may be placed over the camera's lens when packed together with a camera in a standard camera/gadget bags, thus saving space. For example, the cowl 130 of the diffuser 120 may be placed directly over the lens of the camera, and the dome 160 may be placed in turn over the generally rectangular base 140 of the diffuser 120. In this way, the parts of the diffuser nest within each other in a compact arrangement.

In an exemplary embodiment, the present diffuser 120 is convertible for use with both low and high ceilings. To this end, FIG. 1 additionally shows the diffuser 120 provided with dome 160 which may be removably attached to the cowl 130 so that the diffuser 120 can be used to provide a more diffuse lighting effect with the dome 160 in place while easily converting for direct flash lighting by removing the dome 160.

When shooting with the diffuser in a vertical position in environments with high ceilings, the cowl 130 may be employed without the dome 160. In one embodiment, the cowl 130 is provided with an open top which lets light energy from the flash shine upwards to reflect off the ceiling in the absence of the dome 160. Due to the shape and orientation of the cowl 130, enough light strikes the sides of the tapered cylindrical body 150 of the cowl 130 to cast some amount of light forward onto the subject even without employing the removable dome 160. This gives a great lighting ratio for shots taken with the diffuser in the vertical position, reducing-shadows on the subject and giving a diffuse, soft light all around the room as well as on the subject. For large group shots, the lighting quality is soft, beautiful and diffuse. The open top allows a great deal of light to bounce off the ceiling onto the subject yielding a beautiful, natural lighting effect.

Figure 6:
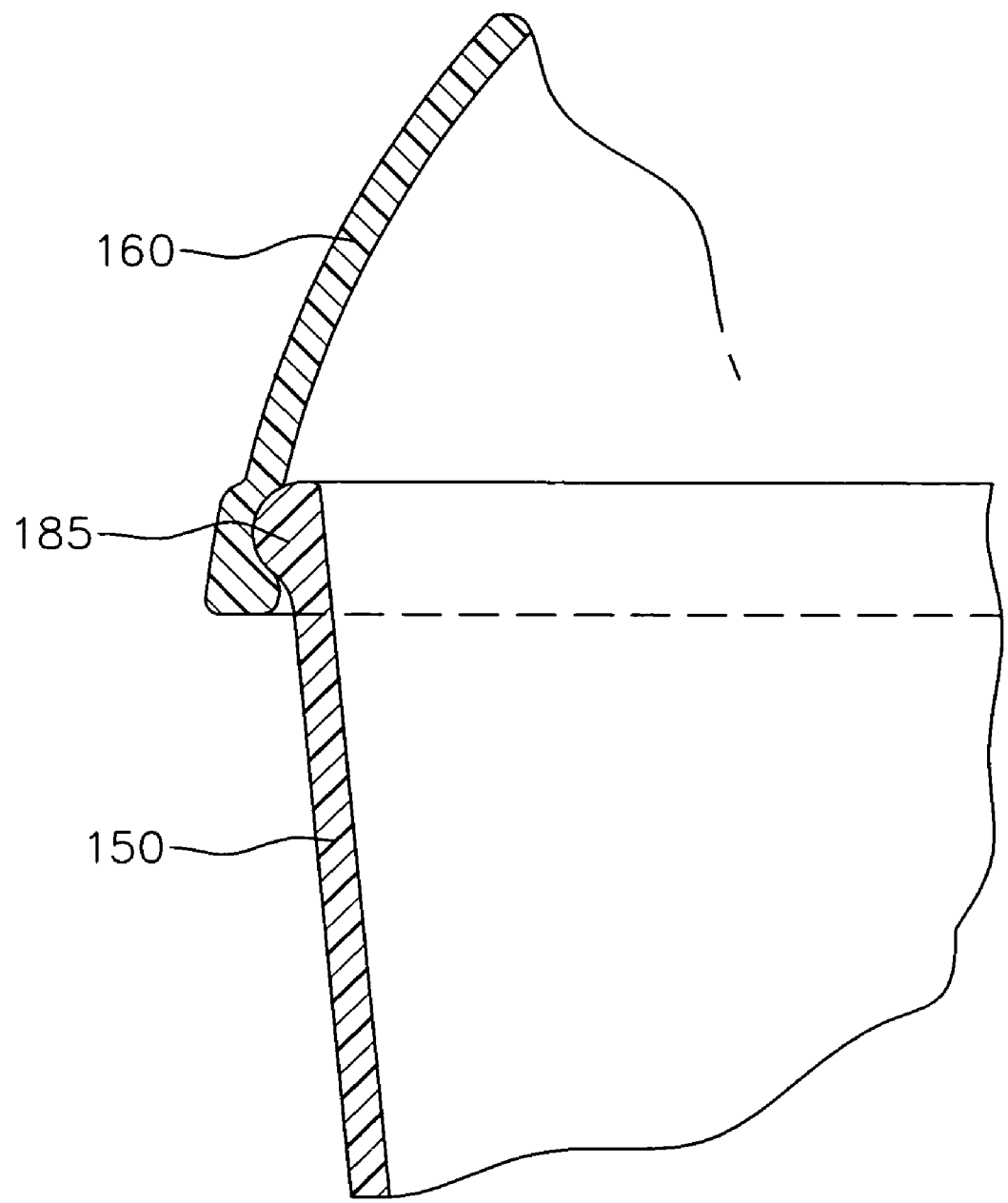
FIG. 6 shows a cross section of a photographic light diffuser according to one embodiment of the present invention.

The dome 160 is provided for indoor environments with low ceilings where reflected light from the ceiling would cast harsh shadows on the subject. In one embodiment, the dome 160 acts as a diffusion device to spread light evenly all around the room, lighting the subject as well as brightening dark backgrounds and ceilings. The dome 160 may snap directly onto the cowl 130 of the diffuser 120 to accomplish this diffusion. Specifically, FIG. 6 shows a cross section of a photographic light diffuser detailing one embodiment of a snap-on system for connecting the dome 160 to the tapered cylindrical body 150, wherein the former is provided with a recess which fits over a snap ridge 185 on the latter. Furthermore, the present combination of cowl 130 and dome 160 loses less power than other diffusers, making it more efficient. With the employment of the dome 160 with the diffuser 120 for use with low ceilings, studio-quality lighting using a flash can be achieved with a portable photography platform.

Additionally, when it is desirable to directly light a subject, it is not necessary to remove the entire diffuser 120 from the flash unit of the camera. The dome 160 only may be removed, and the flash pointed directly at the subject through the open top of the cowl 130 which remains attached to easily and directly illuminate the subject with no power loss.

On occasion, photographers will want the reflected light in their shots to have a particular color quality. This can be provided with alternative embodiments of the present diffuser wherein the material of the entire diffuser itself, or specific portions of the diffuser such as the cowl or the base are formed having a particular hue. For example, the dome 160 can be made amber for inside shots to provide warmer skin tones and for overall warming in flash filled available light shots, and green for shots where there is a good deal of florescent lighting.

Figure 8:
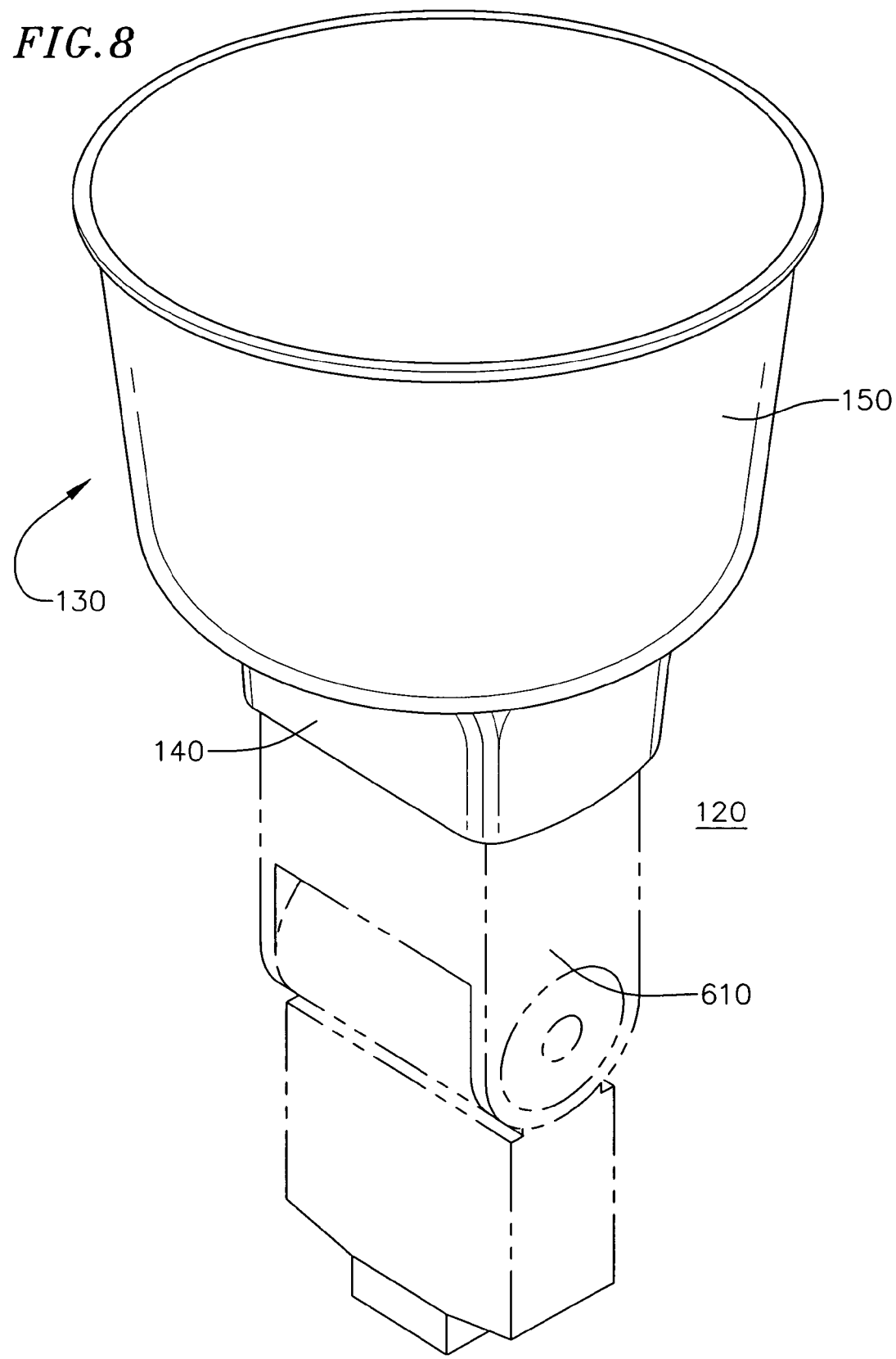
FIG. 8 shows a perspective view of a diffuser in use atop a flash head.

FIG. 8 shows a perspective view of a diffuser 120 in use atop a flash unit 610. In the embodiment shown, the diffuser 120 is employed without the removable dome shown in the previous figures. The generally rectangular base 140 of the diffuser 120 is socketed over the head of the flash unit 610 so that the light emitted by the flash may be diffused by the components of the cowl 130 of the diffuser 120, specifically the generally rectangular base 140 and the tapered cylindrical body 150.

Figure 9:
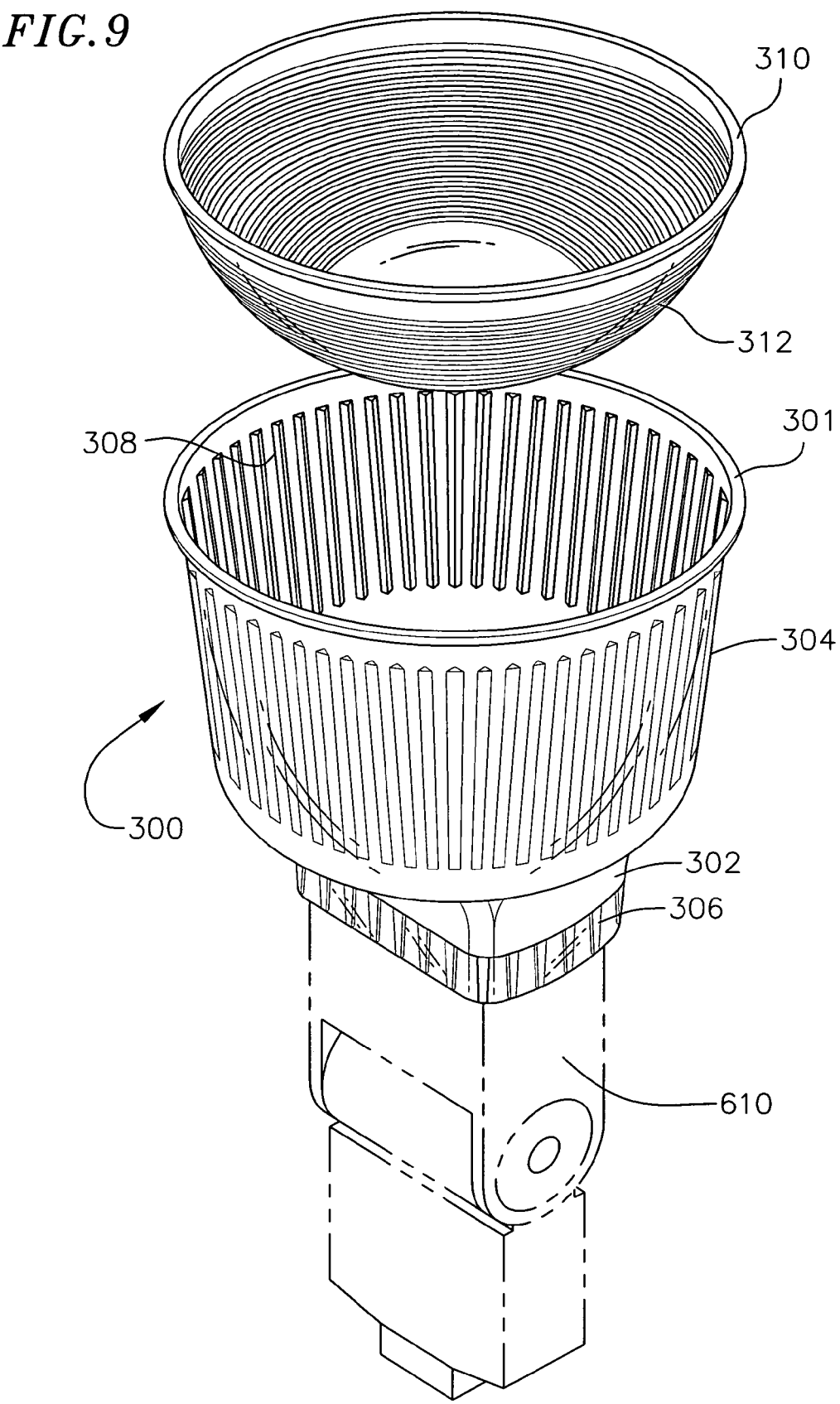
FIG. 9 shows a perspective view of an alternative embodiment of the photographic light diffuser.

FIG. 9 shows a perspective view of an alternative embodiment of a diffuser 300 in use atop a flash unit 610. A cowl 301 of the diffuser 300 includes a neck portion 302 and a body portion 304. The diffuser 300 can be formed from any suitable material. For example, the diffuser can be formed of a vinyl material which is capable of stretching. The vinyl used to form the diffuser 300 can be clear and bead blasted, which allows for greater dispersion of light through the diffuser. In this embodiment, a variety of flash units having different shapes can be inserted into the cowl 301 without the need to use the adaptor 290 (see FIG. 3). The neck portion 302 of the cowl 301 stretches to fit many flash units of various manufacturers, which are placed into the cowl 300 as described above. Contact arms 306 may extend along the basal socket 170 (see FIG. 2) from the bottom of the cowl 301 along the inside thereof. The contact arms 306 grip the flash unit 610 to ensure that the diffuser 300 does not fall off the flash unit during camera operation.

Ribs 308 extend along an inside surface in the body portion 304 of the cowl 301. The ribs can extend substantially parallel to the flash unit 610, or, they can extend around the circumference of the body portion 304 of the cowl 301. The ribs 308 can also extend on an outer surface of the cowl 301. The ribs 308 allow light to be more effectively diffused as it passes through the cowl 301 and into the area in which a photograph is being taken.

The cowl 301 can be operated by itself or in conjunction with a dome cover 310 which may optionally include ribs 312. When the cowl 301 is used by itself, the light from the flash unit 610 escapes from the top without being diffused, throwing a concentration of direct light upward into the surrounding area. In an enclosed space, the direct light can lighten the room in colliding with the ceiling, without casting the harsh light of the flash directly onto the subject. An upper portion of the body portion of the cowl 301 can be trimmed around a circumference of the cowl 301 as desired to allow a greater amount of light to escape from the top without being diffused.

Where the room is sufficiently lighted such that the direct light is not needed, the dome cover 310 can be used in an upright or an inverted position to avoid the effects of direct flash lighting. The inverted dome 310 can be snapped into the cowl 301, or can be formed integrally with the cowl 301.

As in previous embodiments discussed herein, the diffuser 300 can be tinted with amber or another color to vary the color and intensity of the light on the subjects of the photograph. Due to its flexible nature, the diffuser 300 can be easily stored and transported in a camera bag. A photographer carrying many different diffusers can stack them for ease in storage and transport.

What is claimed is:

1. A photographic light diffusing device comprising:
an at least partially transparent cowl defining a flexible base with a first opening adapted to be mounted on a photographic light source and a plurality of contact arms adapted to grip the photographic light source, the cowl including a plurality of integral and at least partially transparent light-diffusing ribs and a second opening through which the photographic light source is visible when the cowl is mounted on the photographic light source; and
a cover that at least partially fills the second opening;
wherein the base is adapted to fit on a plurality of different photographic light sources.

2. The photographic light diffusing device of claim 1, wherein the cover is of a dome shape.

3. The photographic light diffusing device of claim 2, wherein the cover is removable.

4. The photographic light diffusing device of claim 2, wherein the dome shape of the cover extends outwardly from the cowl.

5. The photographic light diffusing device of claim 2, wherein the dome shape of the cover extends inwardly from the cowl.

6. The photographic light diffusing device of claim 1, wherein the cowl is tinted.

* * * * *